United States Patent
Rao et al.

(10) Patent No.: US 10,949,906 B2
(45) Date of Patent: Mar. 16, 2021

(54) VISUAL DIAGRAM SEARCHING

(71) Applicant: eBay Inc., San Jose, CA (US)

(72) Inventors: Shilpa Jois Rao, Cupertino, CA (US); Seyed-Mahdi Pedramrazi, San Jose, CA (US); Shaumik Chandra Mondal, San Jose, CA (US); Subramanian Sri Sankaran, Milpitas, CA (US); Bryan Ephraim Freeland, Half Moon Bay, CA (US); Rita Marion Bosch, Austin, TX (US); James L. Grubbs, Jr., San Jose, CA (US); Dong Chen, San Jose, CA (US)

(73) Assignee: eBay Inc., San Jose, CA (US)

( * ) Notice: Subject to any disclaimer, the term of this patent is extended or adjusted under 35 U.S.C. 154(b) by 233 days.

(21) Appl. No.: 15/959,929

(22) Filed: Apr. 23, 2018

(65) Prior Publication Data
US 2019/0325499 A1    Oct. 24, 2019

(51) Int. Cl.
*G06Q 30/06* (2012.01)
*G06F 16/248* (2019.01)
(Continued)

(52) U.S. Cl.
CPC ....... *G06Q 30/0627* (2013.01); *G06F 16/248* (2019.01); *G06F 16/9535* (2019.01); *G06Q 30/0643* (2013.01); *G06F 3/0482* (2013.01)

(58) Field of Classification Search
CPC ............... G06Q 30/0601–0645; G06F 3/0482
(Continued)

(56) References Cited

U.S. PATENT DOCUMENTS 7,660,468 B2    2/2010    Gokturk et al.
7,766,221 B2    8/2010    Kasahara
(Continued)

FOREIGN PATENT DOCUMENTS

WO    2018/002333 A1    1/2018
WO    2019/209393 A1    10/2019

OTHER PUBLICATIONS

Blanco, C. F., Sarasa, R. G., & Sanclemente, C. O. (2010). Effects of visual and textual information in online product presentations: Looking for the best combination in website design. European Journal of Information Systems, 19(6), 668-686. doi:http://dx.doi.org/10.1057/ejis.2010.42.*
(Continued)

*Primary Examiner* — Resha Desai
(74) *Attorney, Agent, or Firm* — FIG. 1 Patents

(57) ABSTRACT

Visual diagram searching techniques are described herein. A visual diagram service enables users to efficiently search for data for item parts even in cases where the name of the item part is unknown. In one or more examples, search query input to locate item parts of an item is received via a user interface displayed by at least one computing device. A visual diagram of the item is displayed in the user interface. The visual diagram includes selectable portions mapped to respective item parts depicted in the corresponding selectable portion of the visual diagram. A user selection of one of the selectable portions of the visual diagram of the item is received via the user interface. In response to the user selection, search result data corresponding to the respective item part depicted in the selected selectable portion of the visual diagram of the item is displayed.

20 Claims, 14 Drawing Sheets

(51) Int. Cl.
*G06F 16/9535* (2019.01)
*G06F 3/0482* (2013.01)

(58) Field of Classification Search
USPC .............................................. 705/26.1–27.2
See application file for complete search history.

(56) References Cited

U.S. PATENT DOCUMENTS

| | | | |
|---|---|---|---|
| 8,463,658 B2 | 6/2013 | Racco | |
| 8,676,649 B2 | 3/2014 | Wiesinger et al. | |
| 8,782,072 B2 | 7/2014 | Bennett | |
| 10,121,171 B1* | 11/2018 | Chang | G06Q 30/0643 |
| 10,140,651 B1* | 11/2018 | Mishra | G06Q 30/0643 |
| 2004/0249727 A1* | 12/2004 | Cook, Jr. | G06Q 10/10 |
| | | | 705/26.81 |
| 2005/0125261 A1* | 6/2005 | Adegan | G06Q 10/06 |
| | | | 705/4 |
| 2008/0015823 A1* | 1/2008 | Arnold | G06F 8/20 |
| | | | 703/1 |
| 2008/0098311 A1* | 4/2008 | Delarue | G06F 16/54 |
| | | | 715/739 |
| 2011/0082735 A1 | 4/2011 | Kannan et al. | |
| 2012/0113138 A1* | 5/2012 | Uusitalo | G06T 11/60 |
| | | | 345/629 |
| 2012/0221433 A1 | 8/2012 | Plattsmier et al. | |
| 2014/0172864 A1 | 6/2014 | Shum | |
| 2016/0063600 A1 | 3/2016 | Wuang | |
| 2017/0039610 A1* | 2/2017 | Sesti | G06F 3/04815 |
| 2018/0113919 A1* | 4/2018 | Datta | G06F 16/9535 |

OTHER PUBLICATIONS

Anonymous, "RealOEM.com: Select Your BMW Model", Retrieved from the Internet URL: <https://web.archive.org/web/20180415085341/http://www.realoem.com/bmw/enUS/select>, May 6, 2015, 1 page.
International Search Report received for PCT Application No. PCT/US2019/015995, dated Apr. 16, 2019, 6 pages.
International Written Opinion received for PCT Patent Application No. PCT/US2019/015995, dated Apr. 16, 2019, 1 pages.
International Preliminary Report on Patentability received for PCT Application No. PCT/US2019/015995, dated Nov. 5, 2020, 9 pages.

* cited by examiner

VISUAL DIAGRAM SEARCHING

BACKGROUND

An increasing number of service provider systems and associated applications surface listings to client devices for various products and services due to advances in computing technologies. Generally, it is easy for a user to search for a particular product via a conventional service provider system by simply providing search query input that identifies the name of the product. However, many products include an assembly of different parts which may wear out or malfunction, and thus need to be replaced. Conventional service provider systems make it difficult for users to search for and locate such product parts, however, because the user often does not know the name or parts number of the product part. Furthermore, even in cases where the user is able to ascertain a name or type of the product part, it can be difficult for the user to determine whether the product parts which are returned will be compatible with the user's product. For example, returned search result listings returned by conventional service provider systems may include a large number of listings for product parts which are designed for a different make, model, year, or version of the product, and thus will not be compatible with the user's product. In this scenario, the user must attempt to filter the search result listings in order to identify a product part which will match the user's product. Further, in many cases, product parts purchased via conventional service provider systems must subsequently be returned because the product part is not compatible with the user's product. Thus, searching for and purchasing product parts using conventional service provider systems is time consuming and frustrating for users.

SUMMARY

Visual diagram searching techniques are described herein. In one or more implementations, a visual diagram service enables users to efficiently search for listing data for product parts even in cases where the name of the product part is unknown. In one or more examples, search query input to locate product parts of a product is received via a user interface displayed by at least one computing device. The search query input may identify the product or category of the product, but does not specifically identify the product part. A visual diagram of the product is displayed in the user interface. The visual diagram includes selectable portions mapped to respective product parts depicted in the corresponding selectable portion of the visual diagram. A user selection of one of the selectable portions of the visual diagram of the product is received via the user interface. In response to the user selection, search result listings corresponding to the respective product part depicted in the selected selectable portion of the visual diagram of the product are displayed. The search result listings can be selected in order to purchase the product part via the service provider system.

In one or more implementations, the visual diagram service is further configured to enable a user to list a product part via the service provider system (e.g., list the product for sale), and associate a portion of a visual diagram with the listed product part during the listing process. In one or more examples, listing information for a product part of a product being listed on a service provider system is received via a user interface displayed by the at least one computing device. A visual diagram depicting product parts of the product is selected based at least in part on the listing information, and the visual diagram is displayed in the user interface. A user selection of a portion of the visual diagram which depicts the product part being listed on the service provider system is received. In response, the selected portion of the visual diagram is mapped to the listing information for the product part. Listing data associated with the product part is generated for storage at the service provider system. The listing data includes the listing information and the mapping of the selected portion of the visual diagram to the listing information.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures.

DETAILED DESCRIPTION

Overview

Figure 1:
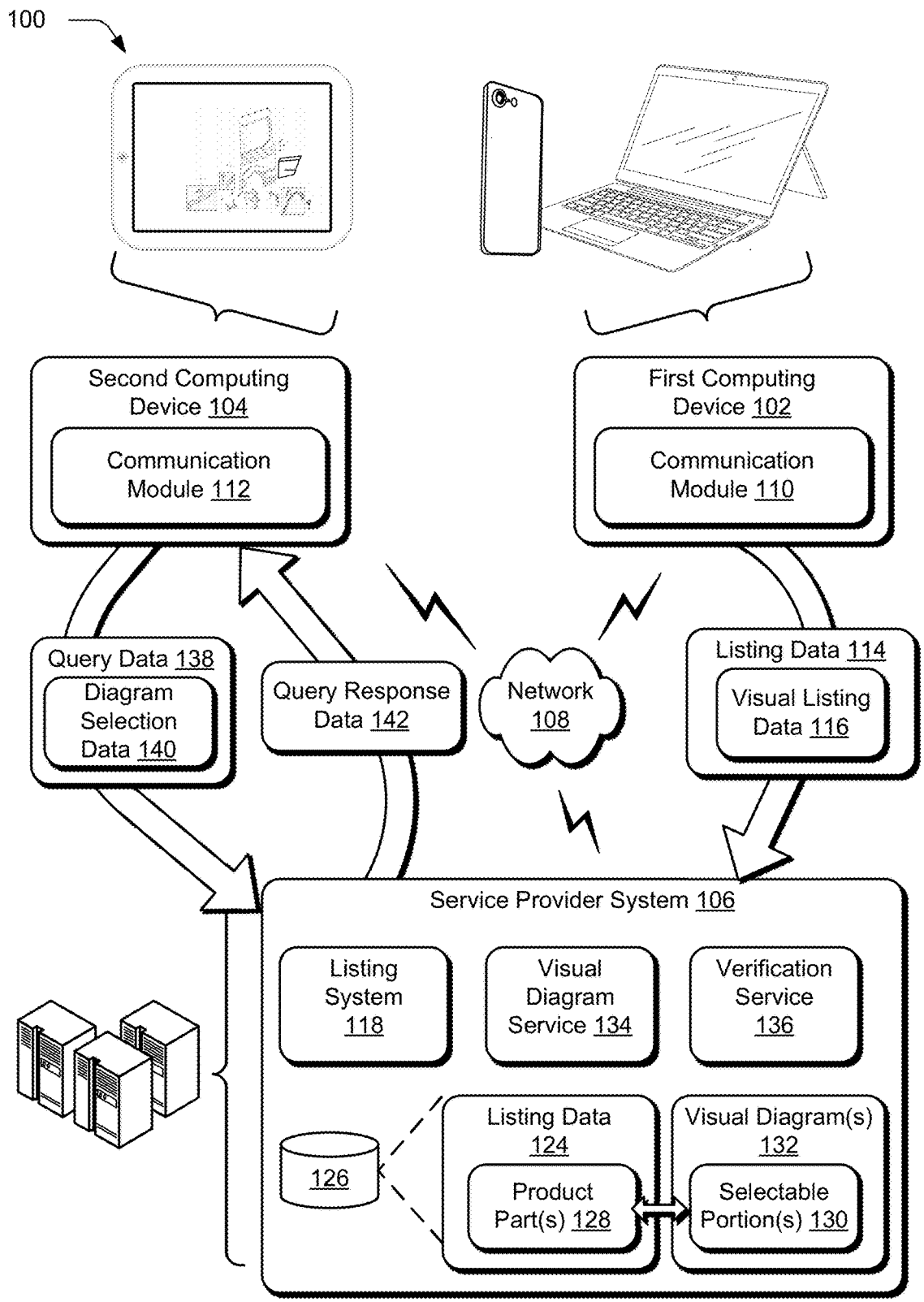
FIG. 1 is an illustration of an example environment in which visual diagram searching systems and techniques may be deployed.

Visual diagram searching techniques are described herein. In one or more implementations, a service provider system obtains listing data associated with various product parts. The listing data may include product parts listed for sale by manufacturers of a given product as well as "aftermarket" or third party parts providers. The service provider system also obtains visual diagrams or schematics for various products, such as vehicles, appliances, electronic devices, and so forth. The visual diagrams depict various product parts for the given product. In some cases, a particular product may include just one visual diagram. For example, a simple product, such as a pair of sunglasses, may include a small number of parts and thus all of the parts may be depicted via a single visual diagram. However, more complex products may include a large number of different parts which cannot be easily depicted via a single visual diagram. In these cases, the service provider system may obtain multiple visual diagrams for a given product, where each visual diagram depicts product parts associated with a different category of the product. A vehicle, for example, may include a separate visual diagram for multiple different categories of the vehicle, such as the engine, the steering wheel, wheels, the stereo system, and so forth. The service provider system maps respective portions of the visual diagram to the product parts listing data. For example, a portion of the visual diagram which depicts a product part is mapped to listing data associated with the respective product part.

Unlike conventional solutions which require the user to know the name of a product part in order to search for the product part via the service provider system, a visual diagram service of the service provider system enables users to efficiently search for listing data for product parts even in cases where the name of the product part is unknown. While the user may not know the name of the product part, the user will often know the name of the product itself as well as a category of the product part. As an example, the user may know the make and model of a particular vehicle and that the product part is positioned on the driver side door of the vehicle, even though the user may not know the specific name or number of the product part.

The visual diagram service displays an improved user interface to assist the user in locating a visual diagram depicting a product part. In one or more examples, the improved user interface leverage the user's knowledge of the product and category of the product by providing a series of prompts which allow the user to first drill down on specific details of the product, such as the product make or brand, product name, year of manufacture, version, model, and so forth. In cases where a product includes multiple visual diagrams, the visual diagram service may include an additional series of prompts which allow the user to drill down on a specific category of the product after the product is identified. In one or more implementations, the visual diagram service may display a 3D representation of an identified product in the user interface, and enable user selection of regions of the 3D representation to further drill down on a particular category of the identified product. In this case, rather than selecting or inputting a product category, the user can select or click various regions of the 3D representation to visually indicate a particular category.

Search query input to locate product parts of a product is received via the user interface. The search query input may identify the product or category of the product, but does not specifically identify the product part. The search query input, for example, may include information provided via the user interface which identifies the product, such as a make, model, year, version, product number, and so forth, as well as a particular category of the identified product.

Based on the search query input, the visual diagram services selects a visual diagram of the product. In cases were the product includes multiple different visual diagrams, the visual diagram service may select the visual diagram based on the category of the product identified by the search query input. The visual diagram of the product is then displayed in the user interface. The visual diagram includes selectable portions mapped to respective product parts depicted in the corresponding selectable portion of the visual diagram. A user selection of one of the selectable portions of the visual diagram of the product is received via the user interface.

In response to the user selection, the visual diagram service identifies the product part depicted by the selected selectable portion, and communicates information identifying the product part to the service provider system. The service provider system then generates search result listings for output. The search result listings correspond to the respective product part that is mapped to the selected selectable portion of the visual diagram associated with the product. The service provider system then returns the search result listings corresponding to the product part for display in a user interface. The search result listings can be selected in order to purchase the product part via the service provider system. The displayed search result listings may include product parts from a variety of different sources, such as the original equipment manufacturer, a third party parts provider, and so forth.

The search result listings can be identified by the service provider system in a variety of different ways. In some cases, the selectable portion of the visual diagram includes an identifier of a depicted product part. The identifier is mapped to external metadata which is used by the service provider system to conduct a search. Notably, in this scenario, the returned search result listings may include a large number of listings which may not all be compatible with the user's product. Alternately, the service provider system may include a verification service which verifies the mapping between selectable portions of the visual diagram and search result listings. In this scenario, the identifier of each selectable portion is mapped directly to the listing data of product parts which have been verified as being compatible with the identified product of the visual diagram. In this way, the returned search result listings are guaranteed to be compatible with the identified product.

Thus, the described techniques solve various problems associated with conventional service provider systems by enabling users to locate product parts even when the name of the product part is unknown. Furthermore, in some cases, the verification service ensures that search result listings correspond to product parts which have been verified to be compatible with the user's product which further increases user confidence that a selected product part will be compatible with their product.

Example Environment

FIG. 1 is an illustration of an example environment in which visual diagram searching systems and techniques may be deployed. The illustrated example includes a first computing device 102, a second computing device 104, and a service provider system 106. The first computing device 102, second computing device 104, and service provider system 106 are communicatively coupled via a network 108. The first and second computing devices 102, 104 are each illustrated with a communication module 110, 112 which represents functionality to enable this communication.

Computing devices that are usable to implement the first computing device 102, the second computing device 104, and the service provider system 106 may be configured in a variety of ways. A computing device, for instance, may be configured as a desktop computer, a laptop computer, a mobile device (e.g., assuming a handheld configuration such as a tablet or mobile phone), wearable devices (e.g., a smartwatch, a smart ring, a fitness band, smart glasses), virtual reality devices, augmented reality devices, holographic devices, and so forth. Thus, computing devices may range from full resource devices with substantial memory and processor resources (e.g., personal computers, game consoles) to a low-resource device with limited memory and/or processing resources (e.g., mobile devices). Additionally, a computing device may be representative of a plurality of different devices, such as multiple servers utilized by a business to perform operations "over the cloud" as further described in relation to FIG. 10.

In the illustrated example, the first computing device 102 is depicted as providing listing data 114 having visual listing data 116 to the service provider system 106. In this example, the first computing device 102 may be associated with a client device user, a product manufacturer, or a third party parts provider that is listing an item via the service provider system 106, e.g., listing the item for sale via the service provider system. Further, the visual listing data 116 may correspond to one or more images or videos of the item corresponding to the listing data. In various implementations, the listing data 114 is associated with a product part of a product that is being listed via the service provider for system. For example, a product part that of a larger product may be listed via the service provider system 106. The visual listing data 116 includes an identifier of a portion of a visual diagram corresponding to the product part. In some cases, this identifier is determined based on a user selection of the portion of the visual diagram which corresponds to the product part being listed via the service provider system 106.

The service provider system 106 provides services accessible via the network 108 to client devices, such as the computing devices 102 and 104. The service provider system 106 includes a listing system 118 which includes functionality to obtain the listing data 114 from the first computing device 102, and to process the received listing data 114. After processing received listing data 114, the listing system 118 may cause this information to be stored as listing data 124 in a storage 126 at the service provider system 106. In some cases, the listing data 124 corresponds to a product part 128 which is listed via the service provider system 106. The service provider system 106 maps listing data 124 of the product part 128 to a selectable portion 130 of a visual diagram 132 associated with the product. For example, a portion of the visual diagram that depicts the product part 128 is mapped to listing data of the product part 128. Doing so causes the listing data of the product part 128 to be returned responsive to a subsequent selection of the respective portion of the visual diagram by a client user.

The service provider system 106 exposes generated digital content via a distribution platform in connection with the obtained information. For instance, the service provider system 106 exposes digital content configured as a listing-for-sale via an electronic commerce platform, e.g., eBay®. Although a single service provider system 106 is depicted in the illustrated example 100, the computing devices 102 and 104 may be configured to access multiple service providers over the network 108 to leverage their respective services, such as a first service provider for performing searches based on search query input and a second service provider for exposing listings based on obtained listing information.

The service provider system 106 is further illustrated as including a visual diagram service 134 and a verification service 136. The visual diagram service 134 represents functionality to interact with applications of the computing devices 102 and 104 to implement product visual diagram searching. The applications may include a browser, a network-enabled application, and so on. The visual diagram service 134, for instance, may interact with one of the applications to receive search query input corresponding to a selection of a selectable portion 130 of a visual diagram 132, identify product parts corresponding to the selected portion of the visual diagram, and return search results for presentation via the application.

Thus, the visual diagram service 134 represents functionality of the listing system 118 to enable client device users to search, locate, and purchase product parts 128 via interaction with displayed visual diagrams 132. For example, the visual diagram service 134 includes functionality to display a visual diagram 132 associated with a product. In one or more implementations, the visual diagram corresponds to an interactive SVG file in which product parts depicted in the file include an identifier of the product part. In response to a user selection of a selectable portion of the visual diagram 132, the visual diagram service 134 determines search result listings (e.g., listing data 124) associated with the product part 128 that is mapped to the selected selectable portion of the visual diagram 132. The search result listings are then displayed via a user interface to enable the user to purchase the respective product part.

Advantageously, the visual diagram service 134 may be configured to generate search results listing for product parts which are compatible with the product. Such search result listing may include product parts offered for sale via the service provider system 106 that are manufactured by an original equipment manufacturer (OEM) of the product, as well as one or more third party parts providers. In this way, the visual diagram service 134 surfaces listings of product parts from a variety of different sources.

In some cases, the visual diagram service 134 is configured to ensure that the search result listings returned are compatible with product identified in the search query input. To do so, the verification service 136 compares listing data for a product part to fitment data associated with the product to verify that the product part will fit a given product. In this scenario, an identifier of each selectable portion is mapped directly to the listing data of product parts which have been verified as being compatible with the identified product of the visual diagram. In this way, the returned search result listings are guaranteed to be compatible with the identified product. Alternately, the identifier of a selectable portion may be mapped to external metadata which is used by the service provider system to conduct a search. Notably, in this scenario, the returned search result listings may include a large number of listings which may not all be compatible with the user's product. In some cases, a variety of different search result listings may be returned, but product parts which have been verified as compatible are identified, such as by listing those product parts in a particular area of the user interface or by causing display of a visual icon which indicates that the product part is verified to be compatible with the product part of the selectable portion selected by the user.

The second computing device 104 is depicted communicating query data 138 that includes diagram selection data 140 to the service provider system 106. The diagram selection data may correspond to a user selection of a selectable portion of the visual diagram by a client device user of the second computing device 104. Broadly speaking, the client device user of the second computing device 104 may have provided the query data 138 to search the listings of the service provider system 106, e.g. to search the listings to purchase a product part 128 listed. In any case, the visual diagram service 134 may perform a search of the listing data 124 to identify listings that match the search query, such as listed product parts 128 corresponding to the selected selectable portion 130 of the visual diagram 132. The service provider system 106 can then generate query response data 142 for communication back to the second computing device. In general, this query response data 142 is indicative of the identified listings. The query response data 142 may correspond to a list of the listings (or a subset of them) that are a match with the product part 128 identified by the diagram selection data 140 of the query data 130. The query response data 142 enables the second computing device 104 to present the corresponding search result listings corresponding to the respective product part 128 for purchase via a user interface. Notably, the ability to access the visual diagrams by computing device 104 may be via a website or application of the service provider system 106 or a via a third party website or application which displays functionality of the visual diagram service 134 (e.g., as an extension or plugin).

Figure 2:
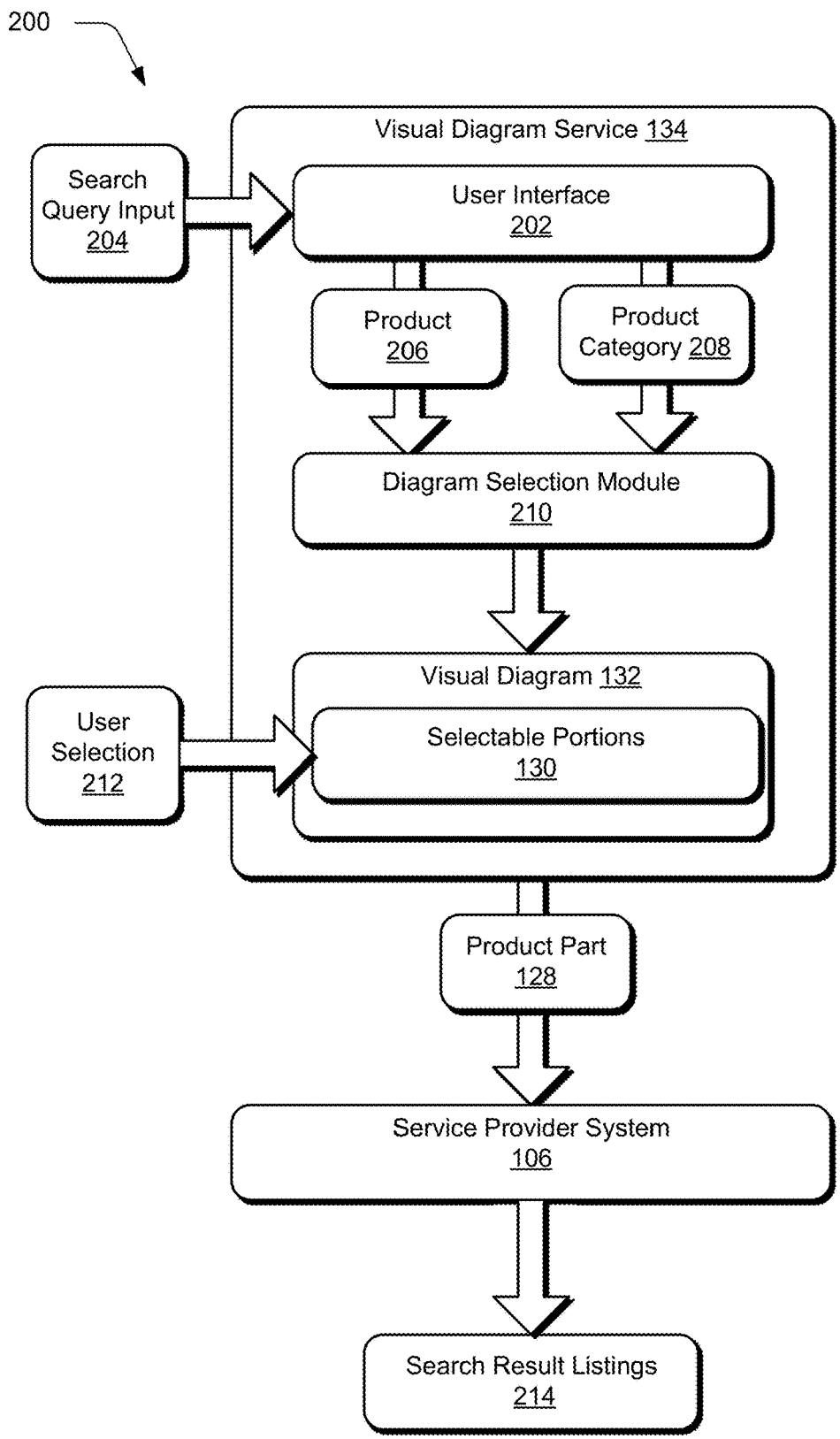
FIG. 2 depicts a system in an example implementation in which operation of the visual diagram service is described in more detail as selecting a visual diagram and generating search result listing based on user selection of a selectable portion of the visual diagram.

FIG. 2 depicts a system in an example implementation 200 in which operation of the visual diagram service 134 is described in more detail as selecting a visual diagram and generating search result listing based on user selection of a selectable portion of the visual diagram.

In example 200, the visual diagram service 134 is depicted as surfacing a user interface 202 configured to enable a client device user to search for product parts listed via the service provider system 106. The user interface 202 displays various prompts which assist the user in finding a visual diagram depicting a product part. The displayed prompts enable the user to specifically identify the product and product category of the product part. The visual diagram service 134 receives search query input 204 to locate product parts of a product, via the user interface 202, and determines product 206 and product category 208 based on the search query input 204. Then, based on the product 206 and the product category 208, a diagram selection module 210 of the visual diagram service 134 selects a visual diagram 132 depicting product parts of identified product 206 and product category 208 for display in the user interface 202.

Figure 3:
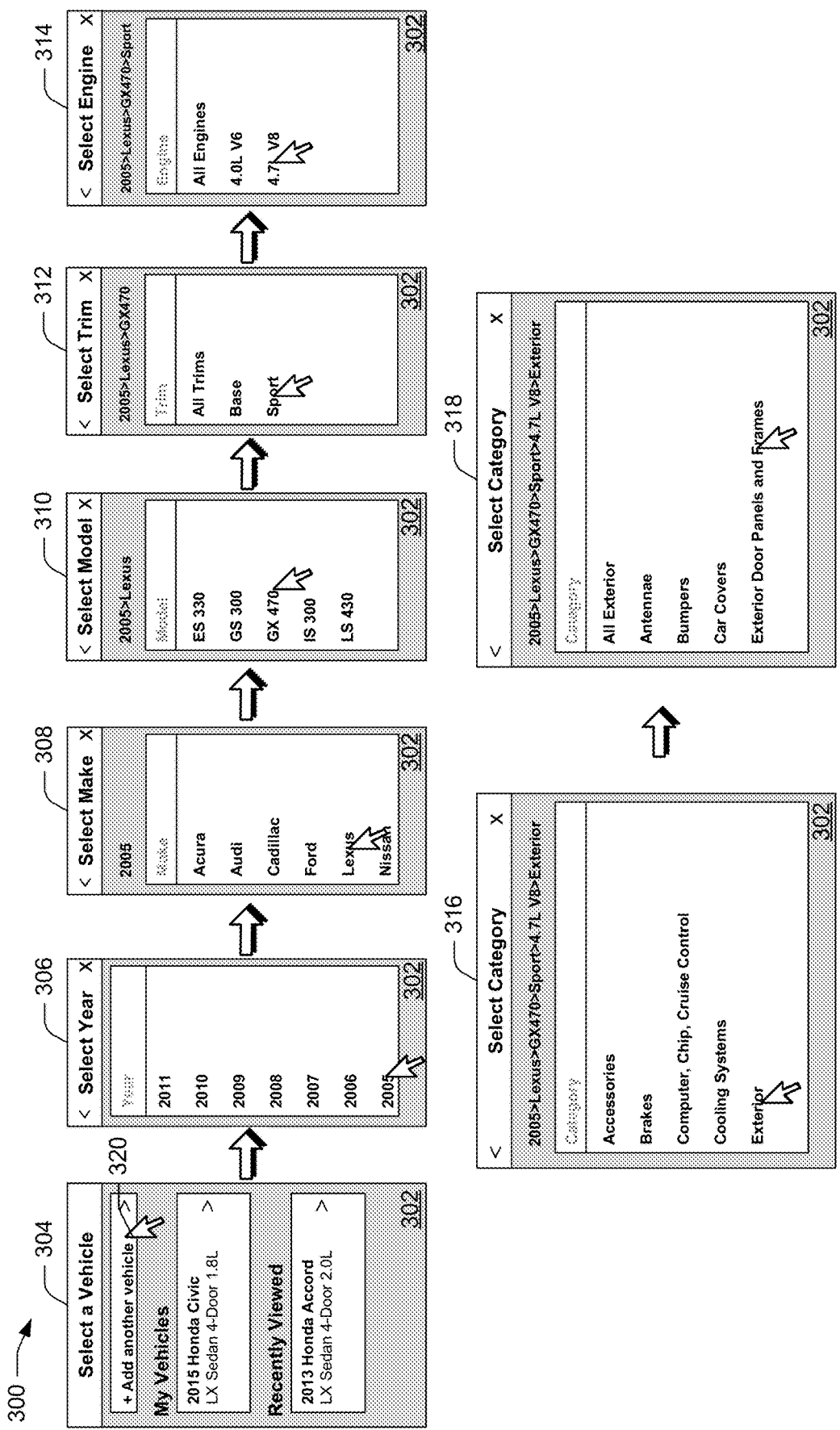
FIG. 3 illustrates an example of a user interface of the visual diagram service.

As an example, consider FIG. 3 which illustrates an example 300 of a user interface 302 of the visual diagram service. The illustrated example shows the user interface 302 at various stages 304-318, where the user interface changes at each stage based on user input to the user interface at the previous stage. Thus user interface 302 is an example of the user interface 202 displayed by the visual diagram service, and enables selection of a visual diagram associated with a vehicle. However, as discussed throughout, the visual diagram service 134 may enable the user to purchase products parts for a variety of different products, including vehicles, appliances, electronic devices, clothing items, and so forth, and thus the user interface 302 may be configured for a variety of different product types.

The illustrated example 300 is also depicted with a cursor 320. In the following examples, the display of a cursor generally represents a focus of user input in relation to the user interfaces. However, it is to be appreciated that the cursor 320 is merely representative of user input focus. In scenarios where user inputs are received using touch functionality, user gestures (e.g., hand, voice, or eye movement), or a stylus device, for instance, the cursor 320 may not be displayed in connection with the user interfaces 302 of stages 304-318. In some cases, the user inputs can be received via user interactions with a holographic display device, such as a head-mounted virtual reality or augmented reality device. However, in scenarios involving mouse-based input the cursor 320 may nevertheless be displayed.

The user interface 302 displays various prompts which assist the user in finding a visual diagram depicting a product part. Stages 304-314 of the user interface 302 include prompts which enable the user to specifically identify the product of the product part, while stages 316 and 318 include prompts which enable the user to identify a category of the product identified at stages 304-314.

For example, at stage 304, the user interface 302 displays visual controls or prompts for selecting a vehicle, which in this example includes visual controls to add a new vehicle, a "my vehicles" control to select a vehicle owned by the user which the user has previously identified, and a recently viewed control to select a vehicle that has been recently viewed by the user via the user interface 302. As shown by the position of cursor 320, a user selection is received to add another vehicle. In response to the user input to the user interface 302 at stage 304, the user interface 302 changes to display visual controls or prompts for selecting a year of a vehicle at stage 306. Notably, the user can type in the year or select an available year from a populated list displayed in the user interface 302. As shown by the position of cursor 320, a user selection is received to select the year "2005" from the user interface 302.

In response to the user input to the user interface 302 at stage 306, the user interface 302 changes to display visual controls or prompts for selecting a make of a vehicle at stage 308. Notably, the user can type in the make of the vehicle or select an available make from a populated list displayed in the user interface 302. The available makes of vehicles in the populated list are based on the previous user input at stages 304 and 306. As shown by the position of cursor 320, a user selection is received to select the make "Lexus" from the user interface 302.

In response to the user input to the user interface 302 at stage 308, the user interface 302 changes to display visual controls or prompts for selecting a model of a vehicle at stage 310. Notably, the user can type in the model of the vehicle or select an available model from a populated list displayed in the user interface 302. The available models of vehicles in the populated list are based on the previous user input at stages 304, 306, and 308. For example, the user interface 302 displays models for 2005 Lexus vehicles. Notably, navigation controls displayed in the user interface 302 enable the user to navigate backwards to a previous stage in the event that the user would like to change the year or make of the vehicle. As shown by the position of cursor 320, a user selection is received to select the model "GX 470" from the user interface 302. Notably, the models displayed in the user interface 302 may include only those models for which a visual diagram is available. For example, if there were no visual diagrams available for the Lexus GX470 then this model may not be displayed in the user interface 302.

In response to the user input to the user interface 302 at stage 310, the user interface 302 changes to display visual controls or prompts for selecting a trim of a vehicle at stage 312. Notably, the user can type in the trim type of the vehicle or select an available trim type from a populated list displayed in the user interface 302. The available trims of vehicles in the populated list are based on the previous user input at stages 304, 306, 308, and 310. For example, the user interface 302 displays trims for 2005 Lexus GX 470 vehicles. As shown by the position of cursor 320, a user selection is received to select the trim "Sport" from the user interface 302.

In response to the user input to the user interface 302 at stage 312, the user interface 302 changes to display visual controls or prompts for selecting an engine type of a vehicle at stage 314. Notably, the user can type in the engine type of the vehicle or select an available engine type from a populated list displayed in the user interface 302. The available engine types of vehicles in the populated list are based on the previous user input at stages 304, 306, 308, 310, and 312. For example, the user interface 302 displays engine types for 2005 Lexus GX 470 Sport vehicles. As shown by the position of cursor 320, a user selection is received to select the engine type "4.7 L V8" from the user interface 302.

Thus, after user input to the user interface 302 at stages 304-314, the visual diagram service is able to identify the specific product 206 as a 2005 Lexus GX470 Sport with a 4.7 L V8 engine. Notably, the categories required to specifically identify the product may vary based on the type of product. Thus, the visual diagram service 134 can configure the user interface 302 based on the product type.

In some cases, a particular product may include just one visual diagram. For example, a simple product, such as a pair of sunglasses, may include a small number of parts and thus all of the parts may be depicted via a single visual diagram. In this scenario, where the product includes just one visual diagram, then the visual diagram service 134 selects visual diagram 132 after the product is identified.

However, more complex products may include a large number of different parts which could not be easily depicted via a single visual diagram. In the case of a vehicle, for example, a different visual diagram may be associated with various different categories of the vehicle, such as the engine, stereo system, doors, wheels, and so forth. Thus, in cases where a product includes more than one visual diagram, the user interface 202 includes prompts which enable the user to identify the product category 208 of the identified product.

As an example, returning to FIG. 3, stages 316 and 318 of the user interface 302 display prompts which enable the user to identify a product category of the product identified based on the user input to the user interface 302 at stages 304-314. For example, in response to the user input to the user interface 302 at stage 314, the user interface 302 changes to display visual controls or prompts for selecting a category of vehicle identified at stages 304-314. Notably, the user can type in the category type or select an available category from a populated list displayed in the user interface 302. The available categories in the populated list are based on the previous user input at stages 304, 306, 308, 310, 312, and 314. For example, the user interface 302 displays categories for 2005 Lexus GX 470 Sport vehicles with a 4.7 V8 engine. As shown by the position of cursor 320, a user selection is received to select the category of "exterior" from the user interface 302.

In response to the user input to the user interface 302 at stage 316, the user interface 302 changes to display visual controls or prompts for selecting a "second level" category of the vehicle identified at stages 304-314. Notably, the user can type in the "second level" category type or select an available category from a populated list displayed in the user interface 302. The available categories in the populated list are based on the previous user input at stages 304, 306, 308, 310, 312, 314, and 316. For example, the user interface 302 displays "second level" categories for the "exterior" category for the 2005 Lexus GX 470 Sport vehicles with a 4.7 V8 engine. As shown by the position of cursor 320, a user selection is received to select the "second level" category of "exterior door panels and frames" from the user interface 302.

Notably, the category controls enable the user to further drill down on the particular category or location of the product part they are searching for relative to the product. This may enable the user to more easily locate product parts for which the user does not know the name. For example, while the user may not know the name of an obscure part for the door of their car, they can first select the exact model of the car via interfaces 304-314, and then narrow down the product parts to being associated with a particular category 208.

In one or more implementations, the visual diagram service may display a 3D representation of an identified product in the user interface 202, and enable user selection of regions of the 3D representation to further drill down on a particular category of the identified product. For example, after the product is identified based on user input to the user interface 302 at stages 304-314, the visual diagram service 134 may display a 3D representation of the identified vehicle in the user interface 302 instead of the additional category prompts of stages 316 and 318.

Figure 4:
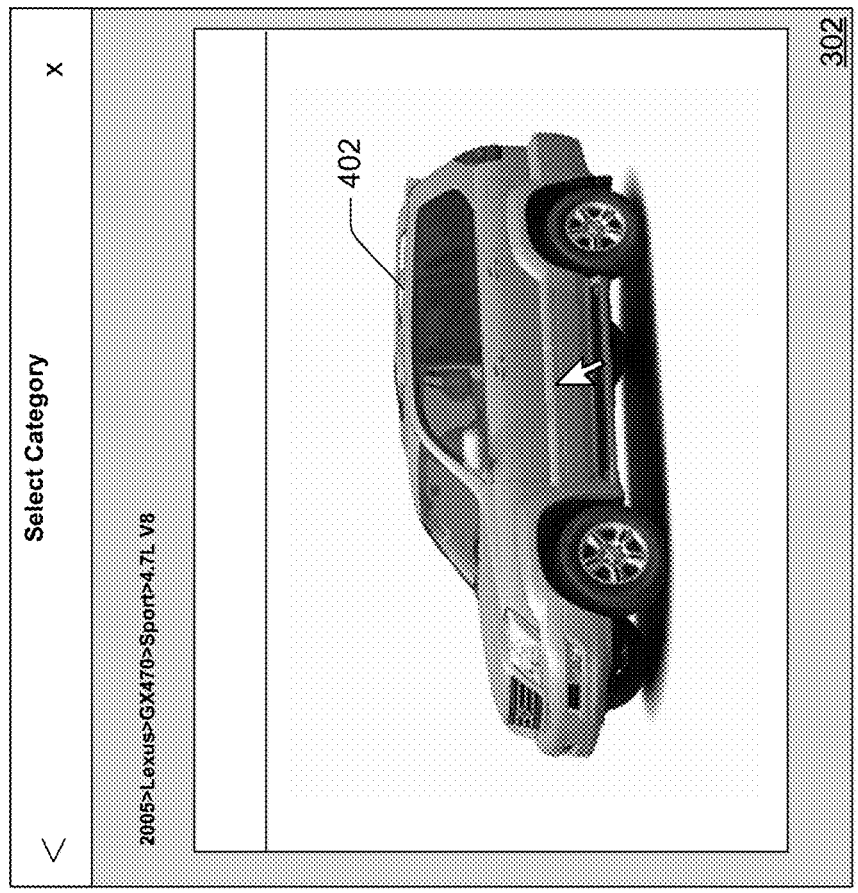
FIG. 4 illustrates an example of a user interface for displaying a 3D representation of an identified product with selectable regions.

As an example, consider FIG. 4 which illustrates an example 400 of a user interface for displaying a 3D representation of an identified product with selectable regions. In this example, after the Lexus GX 470 Sport vehicle is identified based on user input to the user interface 302 at stages 304-314, the visual diagram service displays a 3D representation 402 of the Lexus GX 470 Sport vehicle in the user interface 302. The 3D representation 402 is configured to enable user interaction. For example, the user can rotate the 3D representation in a 360 degree environment to view various different regions of the vehicle. Rather than selecting a product category, the user can select or click various regions of the vehicle to visually indicate a particular category. For example, the user may select the "door" of the vehicle in order to search for visual diagrams associated with the driver's side door of the identified product.

In one or more implementations, visual diagram service 134 can identify the product and/or product part based on a photo provided by the user or real-time streaming video from a camera of a user device. For example, the user may take a photo of the product or product part and upload the photo to the visual diagram service 134, or provide real-time streaming video using the camera of the user device. The visual diagram service may then then identify the product or product part using machine vision techniques which recognize the or product part based on the photo or streaming video. The visual diagram service 134 may then select the appropriate visual diagram based on the recognized product or product part in the photo.

Returning to FIG. 2, the diagram selection module 210 selects a visual diagram 132 for display based on the identified product 206 and product category 208. The visual diagram service 134 then displays digital content corresponding to the selected visual diagram 132 in the user interface 202. As described throughout, the visual diagram 132 may be a 2D or 3D diagram, schematic, or model of the identified product 206 or portion of the identified product 206 corresponding to the identified product category 208. As discussed throughout, the visual diagram 132 visually depicts various product parts of product 206 in selectable portions 130 which are selectable to initiate a search for the respective product part.

Figure 5A:
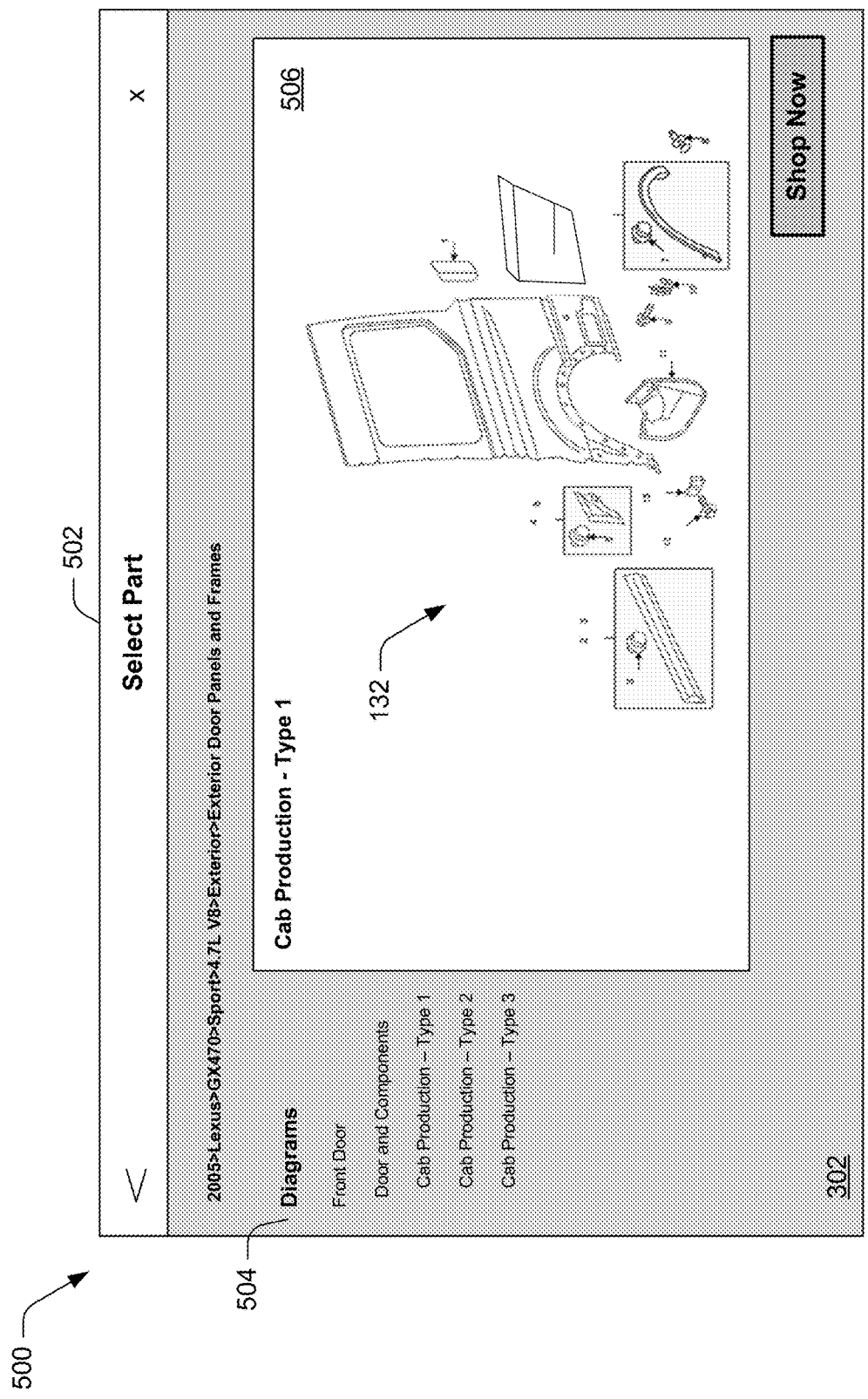
FIGS. 5A, 5B, and 5C illustrate examples of displaying a visual diagram in a user interface in accordance with one or more implementations.
Figure 5B:
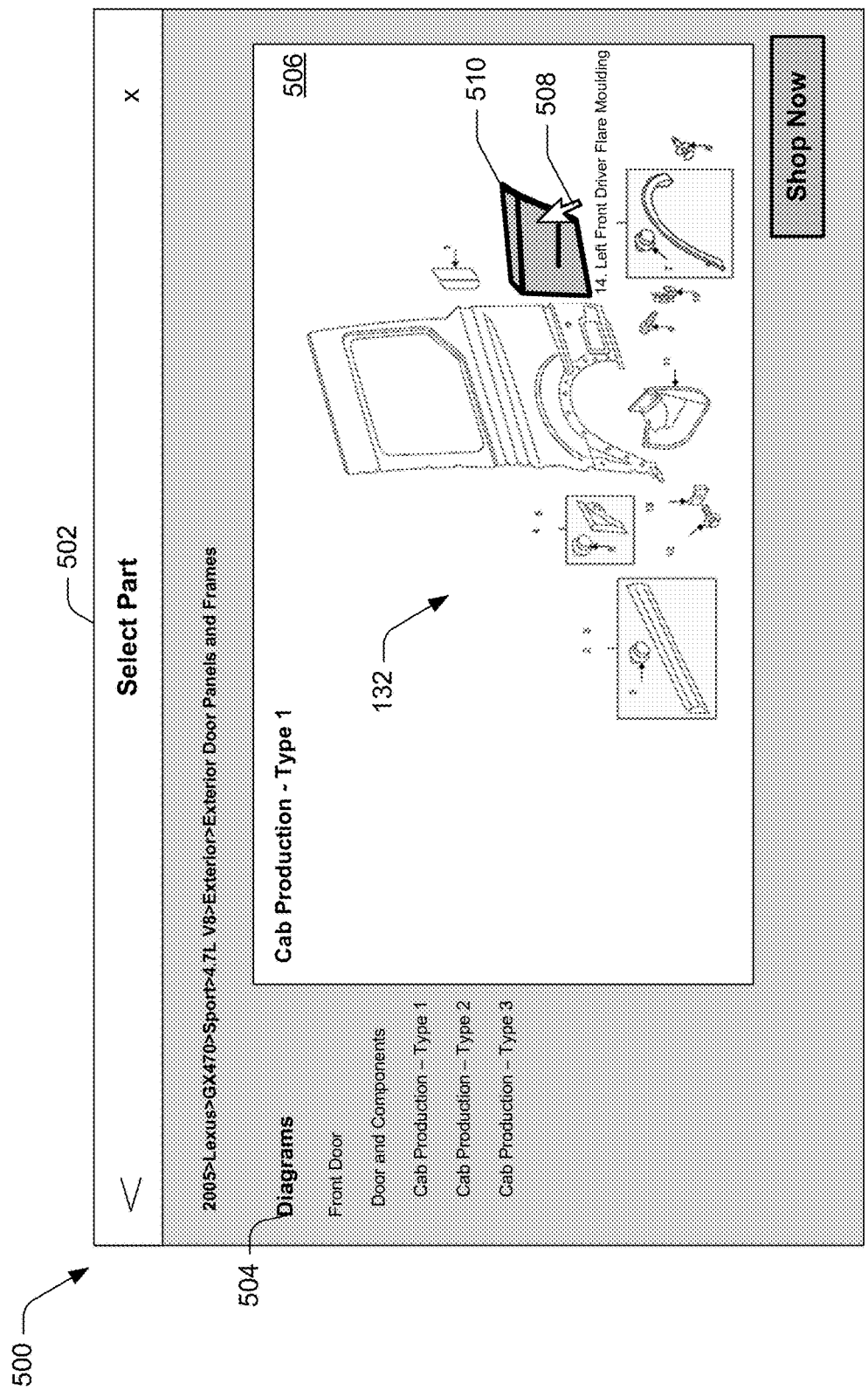
Figure 5C:
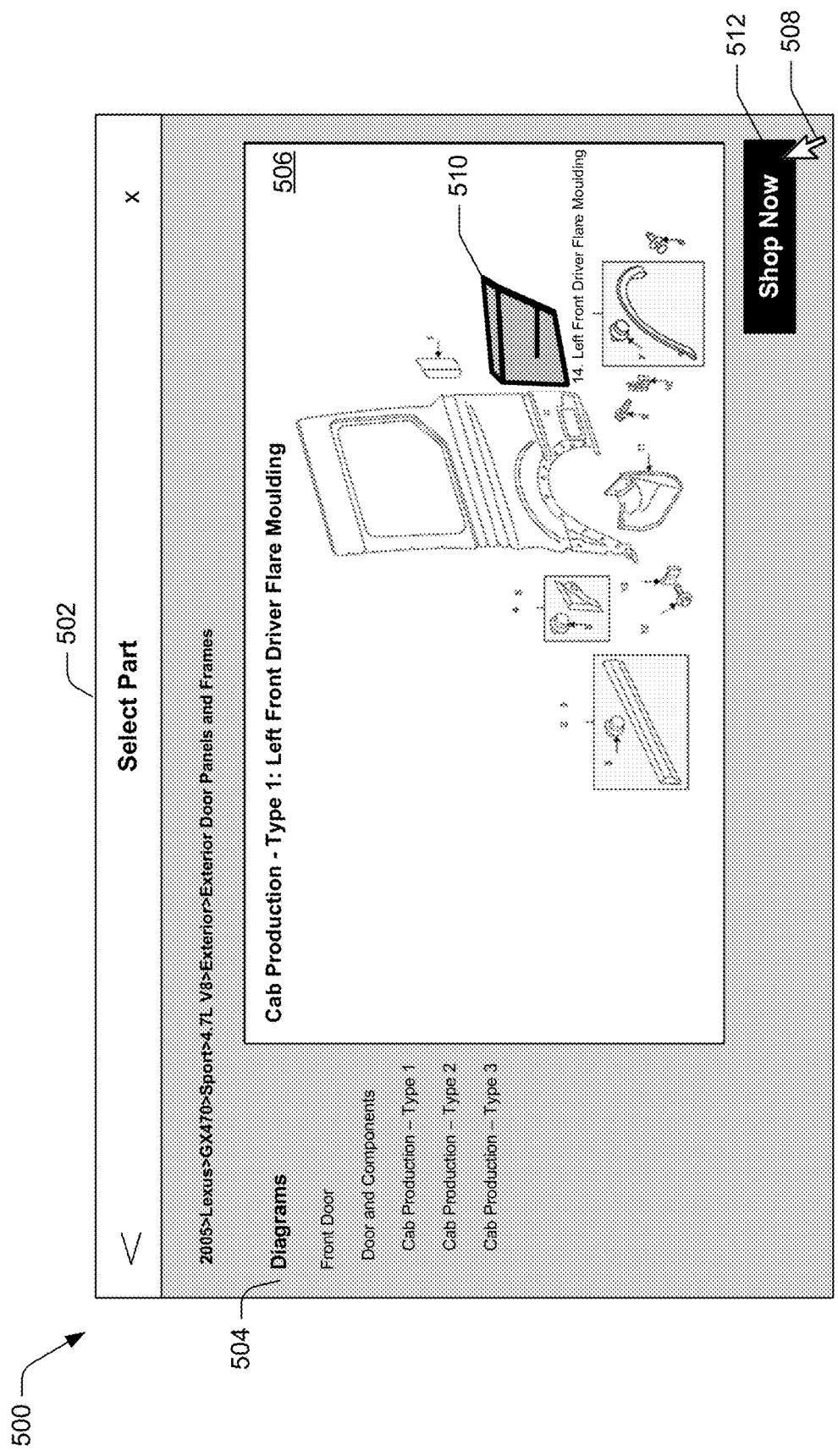

As an example, consider FIGS. 5A, 5B, and 5C which illustrate examples 500 of displaying a visual diagram 132 in a user interface 202 in accordance with one or more implementations.

In FIG. 5A, user interface 502 displays a visual diagram 132 which is selected by the diagram selection module 210 based on the product 206 and product category 208. In this example, the visual diagram 132 corresponds to the product and product category identified based on search query input to user interface 302 at stages 304-318 of FIG. 3. The user interface 502 includes a diagram selection portion 504 which includes a list of available visual diagrams for the determined product and category. In this example, a user selection has been received for diagrams corresponding to "Cab Production—Type 1". The user interface 502 further includes a diagram portion 506 which displays the visual diagram 132 associated with the identified product 206 and product category 208. Notably, navigation controls displayed in the user interface 502 enable the user to navigate backwards (e.g., to stages 304-318 of user interface 302) in the event that the user would like to change the details of the product or product category.

The visual diagram 132 displayed in diagram portion 506 of user interface 502 depicts various product parts for the product 206 and product category 208, which in this example includes product parts for the exterior door panel and frames of the Lexus GX470 Sport vehicle. The visual diagram is configured for user interaction by configuring the visual diagram with selectable portions 130 which correspond to the depicted product part in the visual diagram. In other words, a selectable portion 130 for a product part occupies a portion of the visual diagram 132 which depicts the product part.

The selectable portions 130 can be selected in order to generate search result listings corresponding to the depicted product part. In some cases, a first type of user input to a selectable portion of the visual diagram causes the visual diagram service 134 to display product part information proximate the selected portion. In FIG. 5B, for example, the user controls a cursor 508 to "hover" over a selectable portion 510 of the visual diagram. In response, the visual diagram service changes the visual appearance of the selected selectable portion 510 of the visual diagram 132 and displays product part information proximate the selected portion. In this instance, the selected selectable portion 510 is highlighted and information identifying the name of the product part is displayed proximate the selectable portion 510, which in this example includes the name of the depicted product part: "Left Front Driver Flare Moulding".

Returning to FIG. 2, a user selection 212 of a selectable portion 130 of the visual diagram 132 is received. In FIG. 5C, for example, the user controls the cursor 508 to select the selectable portion 510. In some cases, the input to select the selectable portion is different than the first input to display information regarding the depicted product part. For example, the user may provide "hover input" over the selectable portion to quickly display information regarding the depicted product part, and click or tap the selectable portion in order to select the selectable portion. Other relevant data may also be displayed in response to the hover input, including by way of example and not limitation, product part information from an original equipment manufacturer of the product part, product part information for a third party parts provider, a number of listings for the product part which are currently available on the service provider system, a selling price or average selling price of the product part on the service provider system, and so forth.

A control to add the product part to a shopping cart may also be displayed in response to the hover input. Of course, a variety of different types of input can be received and recognized by the visual diagram service 134. In FIG. 5C, in order to complete the user selection, the user then selects a shop now control 512 while the selectable portion 510 is in its selected state.

In response to the user selection 212, the visual diagram service 134 identifies the product part 128 depicted by the selected selectable portion 130, and communicates information identifying the product part 128 to the service provider system 106. The service provider system 106 then generates search result listings 214 for output. The search result listings 214 correspond to the respective product part 128 that is mapped to the selected selectable portion 130 of the visual diagram 132 associated with the product 206.

The search result listings 214 can be identified by the service provider system 106 in a variety of different ways. In some cases, the selectable portion 130 of the visual diagram 132 includes an identifier of depicted product part. The identifier is mapped to external metadata which is utilized by the service provider system to conduct a search. Notably, in this scenario, the search result listings 214 may include a large number of listings which may not all specifically correspond to the product part of the selectable portion. In some cases, the identifier of each selectable portion is mapped directly to listing data of product parts which have been verified as being compatible with the identified product of the visual diagram by the verification service 136.

The service provider system 106 causes display of the search result listings 214 corresponding to the product part 128 in a user interface. The search result listings 214 may be selectable to enable the user to purchase the respective product part. In some cases, the search result listings are displayed in the user interface 202 of the visual diagram service 134. For example, the search result listings can be displayed on the user interface 202 proximate the displayed visual diagram 132 in response to the user selection.

In one or more implementations, the search result listings 214 can be displayed in an application or web page remote from the user interface 202 of the visual diagram service 134. For example, the visual diagram service 134 may be implemented as a widget or plug-in to display the user interface 202 within a third-party web page. In this scenario, the search result listings 214 can be displayed in a different web page or application. For example, user selection 212 can launch a new tab in a web browser to display the search result listings in a web page of the service provider system 106 which is different than the third party web page. As an example, the visual diagram service may be embedded within a BMW enthusiasts web page. The visual diagram service 134 may be configured with pre-defined information to configure the visual diagram service 134 to display information corresponding to the associated third party web page. In this example, the visual diagram service may be configured to display products associated with BMWs. In response to selection of a selectable portion of the visual diagram, however, a web page is launched in a new tab to display the search result listings (e.g., ebay.com).

Figure 6A:
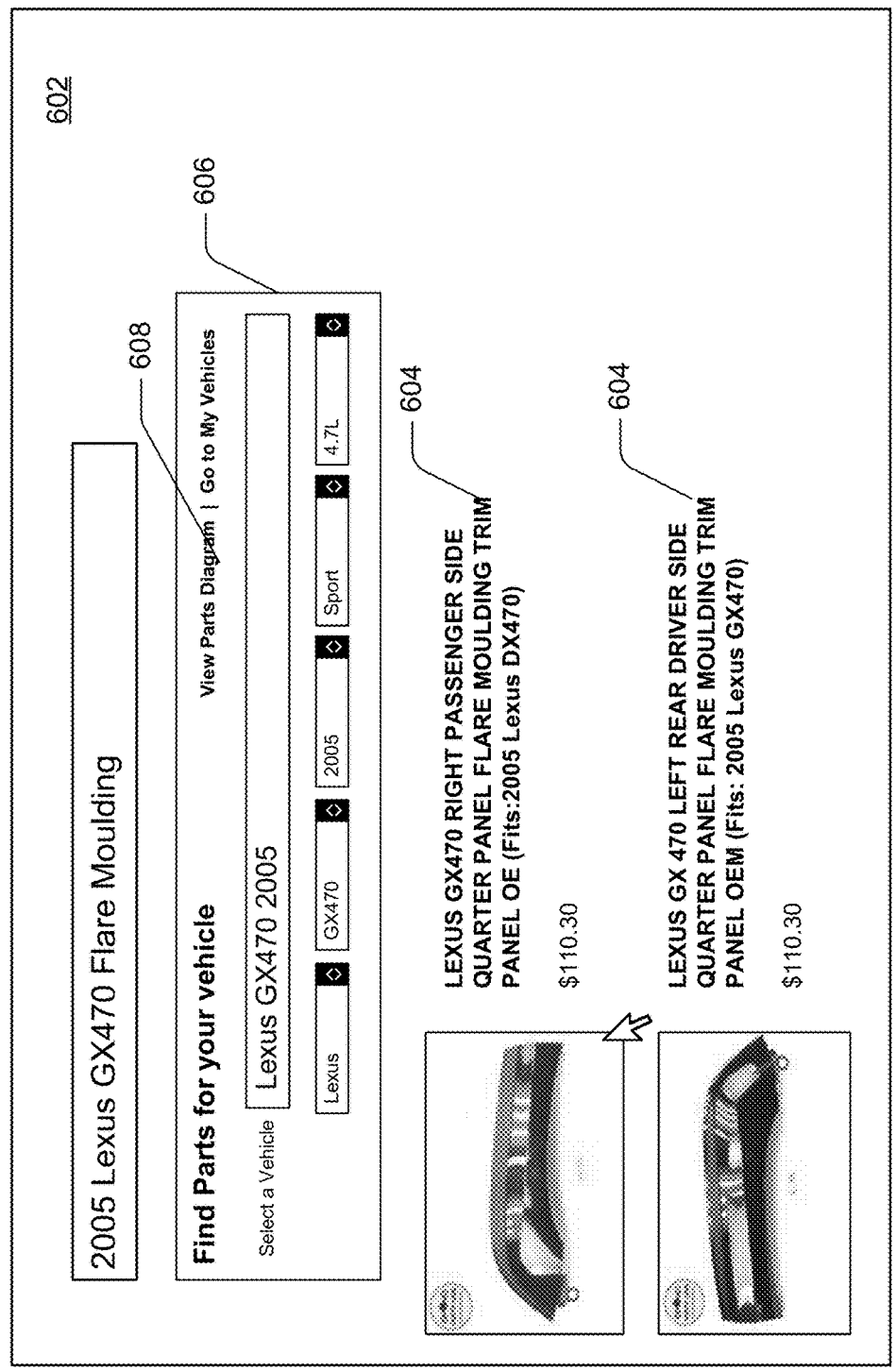
FIGS. 6A, 6B, and 6C depict an example implementation 600 in which a user interface 602 displays search result listings 604 returned response to user interaction with a visual diagram 132.
Figure 6B:
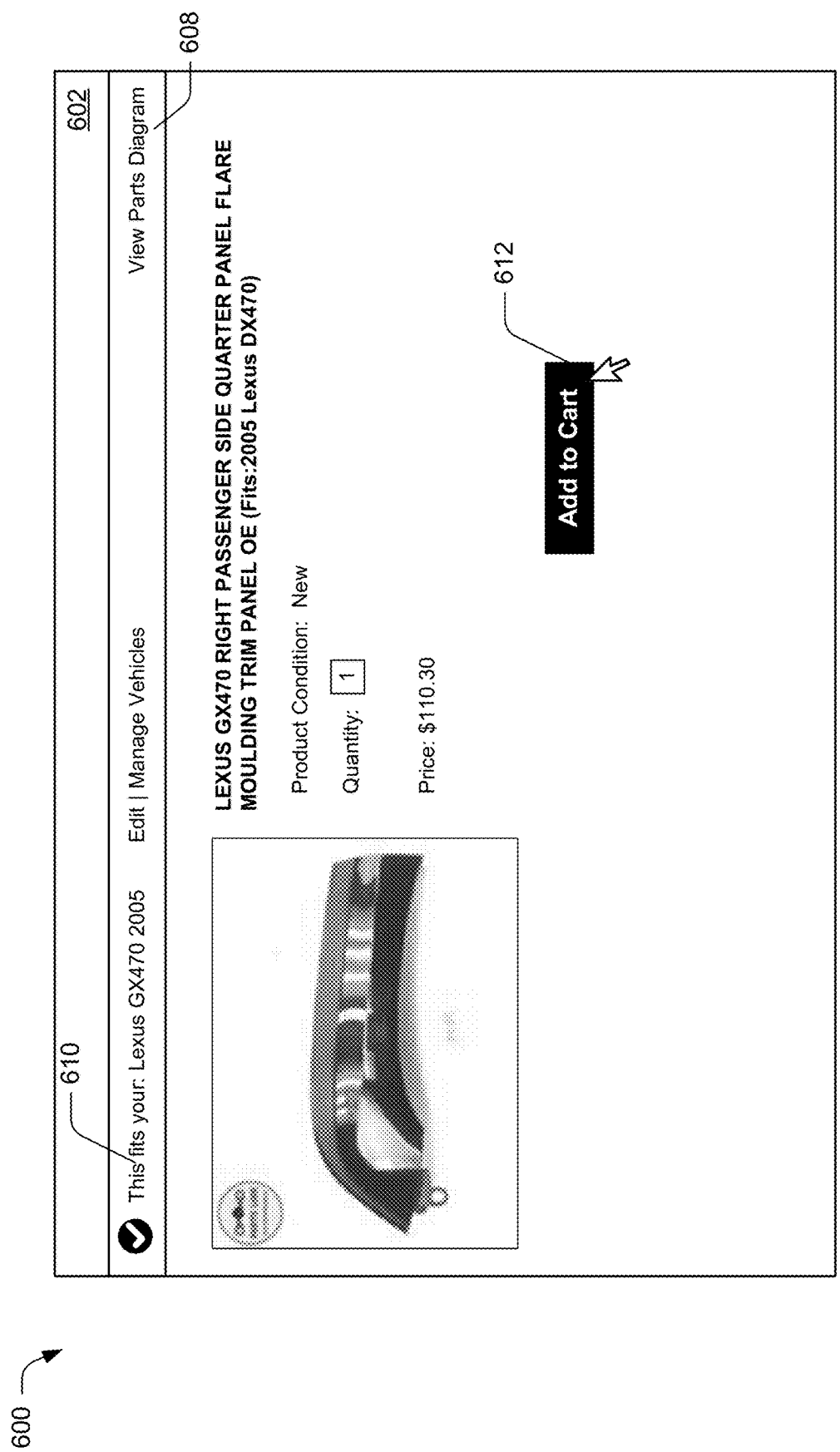
Figure 6C:
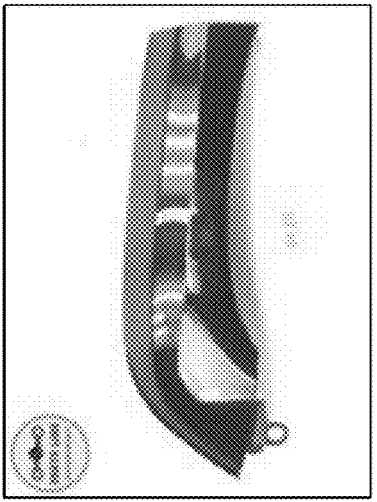

FIGS. 6A, 6B, and 6C depict an example implementation 600 in which a user interface 602 displays search result listings 604 returned response to user interaction with a visual diagram 132. In this example, the search result listings 604 correspond to a "flare" moulding for the 2005 Lexus gX470 vehicle identified via user interactions with the user interfaces of FIGS. 3 and 5. As discussed throughout, the search result listings 604 may correspond to product parts from a variety of different sources, such as an OEM, a third party parts provider, and so forth.

User interface 602 further includes a parts control 606 which enables the user to provide input to update the information associated with the identified product. The parts control 606 also includes a diagram control 608 which is selectable to cause the visual diagram service 134 to display the visual diagram 132 with its selected state (e.g., by transitioning back to display user interface 502 of FIG. 5A. Thus, user interface 602 enables the user to efficiently update the search results listings either by changing a parameter of the search or selecting a different part from the visual diagram 132.

In this example, a user selection of the first search result listing 604 is received via the user interface 602. In response, the user interface 602 is updated to display additional details regarding the selected search result listing 604, which is depicted in FIG. 6B. Additionally, verification information 610 is displayed in the user interface 602 depicted in FIG. 6B which visually indicates that the selected search result listing will fit the identified product. In response to a user selection of an add to cart control 612, the user interface 602 transitions to display a shopping cart view in which the selected search result listing 604 is displayed, which is depicted in FIG. 6C. The user can then select a proceed to checkout control 614 in order to proceed to checkout and purchase the product part of the selected search result listing. Notably, in each view of the user interface 602, the user is able to navigate back to the visual parts diagram in the event that the user would like to modify the selected product part via selection of the diagram control 608.

Figure 7:
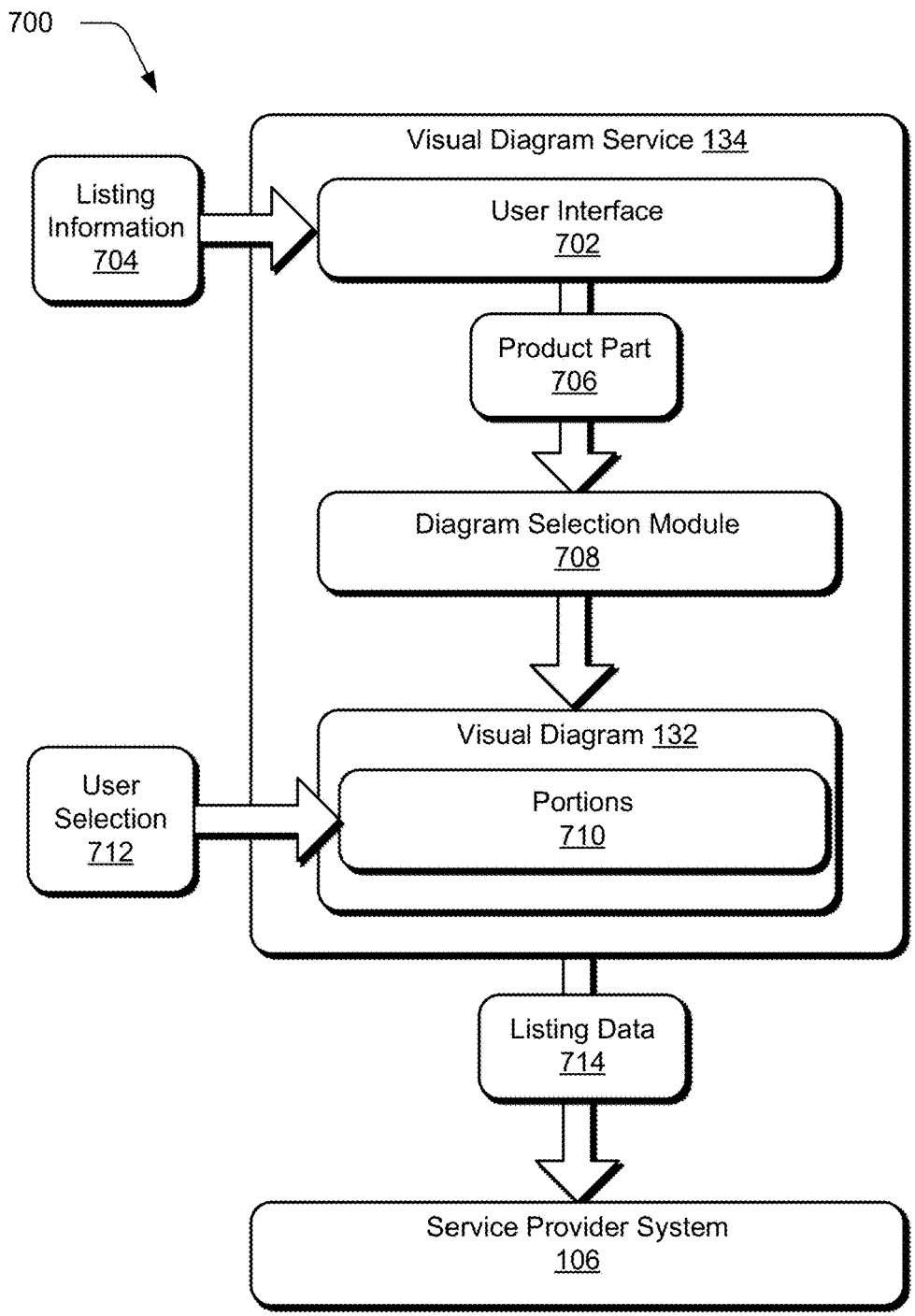
FIG. 7 depicts a system in an example implementation in which operation of the visual diagram service is described in more detail as enabling the mapping of a product being listed via a service provider system to a portion of a visual diagram which depicts the product part.

In one or more implementations, the visual diagram service 134 is further configured to enable a user to list a product part via the service provider system 106, and associate a portion of a visual diagram with the listed product part during the listing process. As an example, consider FIG. 7 which depicts a system in an example implementation 700 in which operation of the visual diagram service 134 is described in more detail as enabling the mapping of a product part being listed via a service provider system to a portion of a visual diagram which depicts the product part.

In this example, the visual diagram service 134 is depicted as surfacing a user interface 702 configured to enable a user to list a product part via the service provider system 106. The visual diagram service 134 receives, via the user interface 702, listing information 704 to list a product part via the service provider system 106. In some cases, the listing information 704 identifies the product and the name or number of the product part being listed. In other cases, the listing information may only identify the name of the product, or a name of the product and information describing a category of the product part, but does not identify the product part. In some cases, the listing information 704 may include a photo of the product part being listed.

The visual diagram service 134 then identifies the product part 706 based on the listing information 704. In cases where the listing information 704 includes a photo of the product part, the visual diagram service 134 may identify the product part 706 using machine vision techniques which recognize the product part based on the photo of the product part. In some cases, the listing information may not specifically identify the product part 706. In this case, the visual diagram service 134 may present prompts to enable the user to identify the product and a product category of the product part in a manner similar to the techniques discussed with regards to FIG. 2 above.

This information is passed to a diagram selection module 708 of the listing system which selects a visual diagram 132 depicting the product part 706 being listed. In cases where the listing information does not specifically identify the product part 706, the diagram selection module 708 may function in a manner similar to the diagram selection module 210 discussed with regards to FIG. 2, above, in which a visual diagram is selected based on a product and product category of the product part being listed.

The selected visual diagram 132 is then displayed in the user interface 702 in a manner similar to the display of the visual diagram 132 in FIGS. 5A-5C. However, rather than enabling user selections of the diagram to trigger the return of search result listings, the user can select a portion 710 of the visual diagram 132 to identify the portion 710 as corresponding to the product part 706 being listed. For example, visual diagram service 134 receives user selection 712 of a portion 710 of the visual diagram 132 to identify the portion of the visual diagram 132 which depicts the product part 706 being listed via the service provider system. In some cases, the visual diagram service 134 can determine, based on the listing information, that a particular portion of the visual diagram likely corresponds to the product part being listed. The visual diagram service 134 can then cause display of a visual indicator over the portion of the visual diagram to recommend user selection of the portion of the visual diagram, or the visual diagram service 134 can automatically pre-select the portion of the visual diagram.

The user selection 712 of the portion of the visual diagram 132 causes listing data 114 to be generated which maps the collected listing information 704 of the product part 706 to the selected portion 710 of the visual diagram 132. The listing data 114 is then communicated to the service provider system 106 for storage such that a subsequent selection of the selected portion 710 (e.g., by a buyer) causes the product part to be returned as part of the search result listings. In one or more implementations, the portions of the visual diagram 132 are already populated with additional listing metadata for the product part, such that selection of the portion 710 causes the additional listing metadata for the product part to be included with the listing data 714 communicated to the service provider system 106 for storage. In some cases, the verification service 136 verifies that the selected portion of the visual diagram corresponds to the product part by comparing the listing information to fitment data associated with the product part.

Example Procedures

This section describes example procedures for visual diagram searching. Aspects of the procedures may be implemented in hardware, firmware, or software, or a combination thereof. The procedures are shown as a set of blocks that specify operations performed by one or more devices and are not necessarily limited to the orders shown for performing the operations by the respective blocks.

Figure 8:
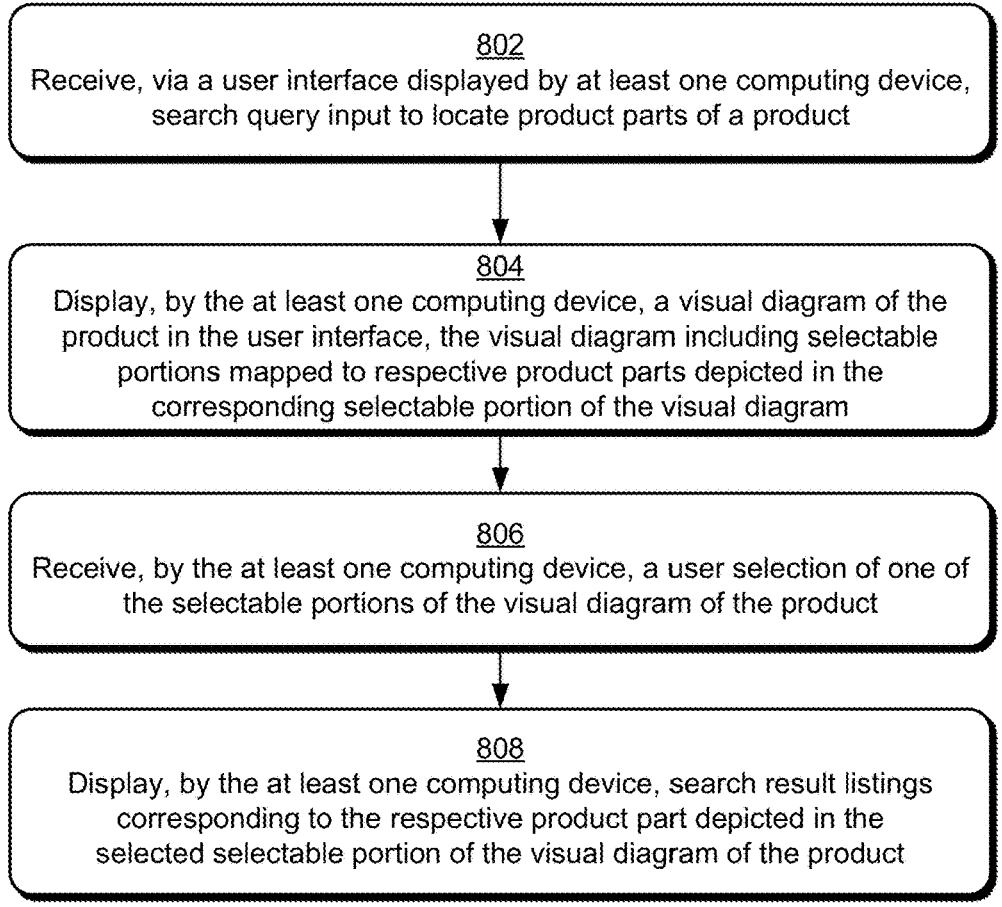
FIG. 8 depicts an example procedure of visual diagram searching in accordance with one or more implementations.

FIG. 8 depicts an example procedure 800 of visual diagram searching in accordance with one or more implementations. Search query input to locate product parts of a product is received via a user interface displayed by at least one computing device (block 802). By way of example, search query input 204 to locate product parts of a product is received via user interface 202 displayed by second computing device 104.

A visual diagram of the product is displayed in the user interface (block 804). The visual diagram includes selectable portions mapped to respective product parts depicted in the corresponding selectable portion of the visual diagram. By way of example, a visual diagram service 134 displays a visual diagram 132 of the product identified by the search query input in a diagram portion 506 of a user interface 502. In one or more implementations, the visual diagram service 134 determines the product 206 and a product category 208 of the product based on the search query input 204. For example, the visual diagram service can display a user interface 202 which includes various prompts to assist the user in finding a visual diagram depicting a product part. The displayed prompts enable the user to specifically identify the product and product category of the product part. In this scenario, the visual diagram service 134 selects the visual diagram 132 from multiple visual diagrams associated with the product based on both the product 206 and the product category 208.

A user selection of one of the selectable portions of the visual diagram of the product is received by the at least one computing device (block 806). For example, a user selection 212 of one of the selectable portions 130 of the visual diagram 132 is received by the at least one computing device, such as when a user controls an input device or the user's finger to click, tap, or otherwise select the selectable portion of the visual diagram.

Search result listings corresponding to the respective product part depicted in the selected selectable portion of the visual diagram are displayed by the at least one computing device (block 808). By way of example, in response to the user selection 212, the visual diagram service 134 identifies the product part 128 depicted in the selected selectable portion 130, and communicates information identifying the product part 128 to the service provider system 106. The service provider system 106 then generates search result listings 214 for output. The search result listings 214 correspond to the respective product part 128 that is depicted in the selected selectable portion 130 of the visual diagram 132 associated with the product 206.

The search result listings 214 can be identified by the service provider system 106 in a variety of different ways. In some cases, the selectable portion 130 of the visual diagram 132 includes an identifier of the depicted product part. The identifier is mapped to external metadata which is utilized by the service provider system to conduct a search. Notably, in this scenario, the search result listings 214 may include a large number of listings which may not all specifically correspond to the product part of the selectable portion. In some cases, the identifier of each selectable portion is mapped directly to listing data of product parts which have been verified as being compatible with the identified product of the visual diagram. The service provider system 106 then causes display of the search result listings 214 corresponding to the product part 128 in a user interface. The search result listings may be selectable to enable the user to purchase the respective product part via the service provider system.

Figure 9:
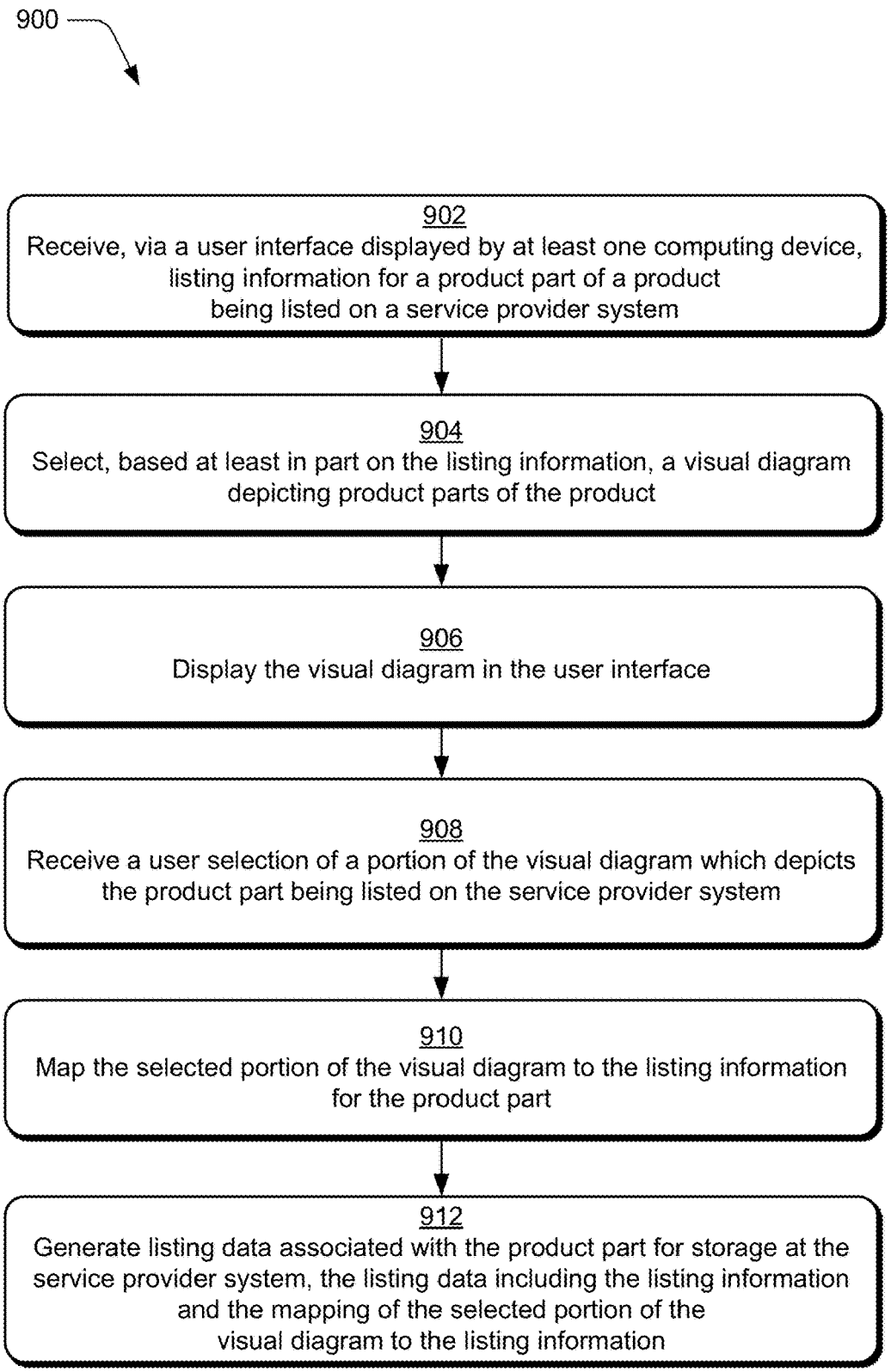
FIG. 9 depicts an example procedure of mapping a product part being listed via a service provider system to a portion of a visual diagram which depicts the product part.

FIG. 9 depicts an example procedure 800 of mapping a product part being listed via a service provider system to a portion of a visual diagram which depicts the product part.

Listing information for a product part of a product to be listed on a service provider system is received via a user interface displayed by at least one computing device (block 902). By way of example, the visual diagram service 134 displays a user interface 702 configured to enable a user to list a product part via the service provider system 106. The visual diagram service 134 receives, via the user interface 702, listing information 704 to list a product part via the service provider system 106. In some cases, the listing information 704 identifies the product and the name or number of the product part being listed. In other cases, the listing information may only identify the name of the product, or a name of the product and information describing a category of the product part, but does not identify the product part. In some cases, the listing information 704 may include a photo of the product part being listed.

A visual diagram depicting product parts of the product is selected based at least in part on the listing information (block 904), and the visual diagram is displayed in the user interface (block 906). For example, the visual diagram service 134 identifies the product part 706 based on the listing information 704. In cases where the listing information 704 includes a photo of the product part, the visual diagram service 134 may identify the product part 706 using machine vision techniques which recognize the product part based on the photo of the product part. In some cases, the listing information may not specifically identify the product part 706. In this case, the visual diagram service 134 may present prompts to enable the user to identify the product and a product category of the product part in a manner similar to the techniques discussed with regards to FIG. 2 above.

This information is passed to a diagram selection module 708 of the listing system which selects a visual diagram 132 depicting the product part 706 being listed. In cases where the listing information does not specifically identify the product part 706, the diagram selection module 708 may function in a manner similar to the diagram selection module 210 discussed with regards to FIG. 2, above, in which a visual diagram are selected based on a product and product category of the product part being listed. The selected visual diagram 132 is then displayed in the user interface 702 in a manner similar to the display of the visual diagram 132 in FIGS. 5A-5C.

A user selection of a portion of the visual diagram which depicts the product part being listed on the service provider system is received (block 908). For example, visual diagram service 134 receives user selection 712 of a portion 710 of the visual diagram 132 to identify the portion of the visual diagram 132 which depicts the product part 706 being listed via the service provider system.

The selected portion of the visual diagram is mapped to the listing information for the product part (block 910), and listing data associated with the product part is generated for storage at the service provider system, where the listing data includes the listing information and the mapping of the selected portion of the visual diagram to the listing information (block 912). By way of example, the user selection 712 of the portion of the visual diagram 132 causes listing data 114 to be generated which maps the collected listing information 704 of the product part 706 to the selected portion 710 of the visual diagram 132. The listing data 114 is then communicated to the service provider system 106 for storage such that a subsequent selection of the selected portion 710 (e.g., by a buyer) causes the product part to be returned as part of the search result listings. In one or more implementations, the portions of the visual diagram 132 are already populated with additional listing metadata for the product part, such that selection of the portion 710 causes the additional listing metadata for the product part to be included with the listing data 714 communicated to the service provider system 106 for storage.

Having described example procedures in accordance with one or more implementations, consider now an example system and device that can be utilized to implement the various techniques described herein.

Example System and Device

Figure 10:
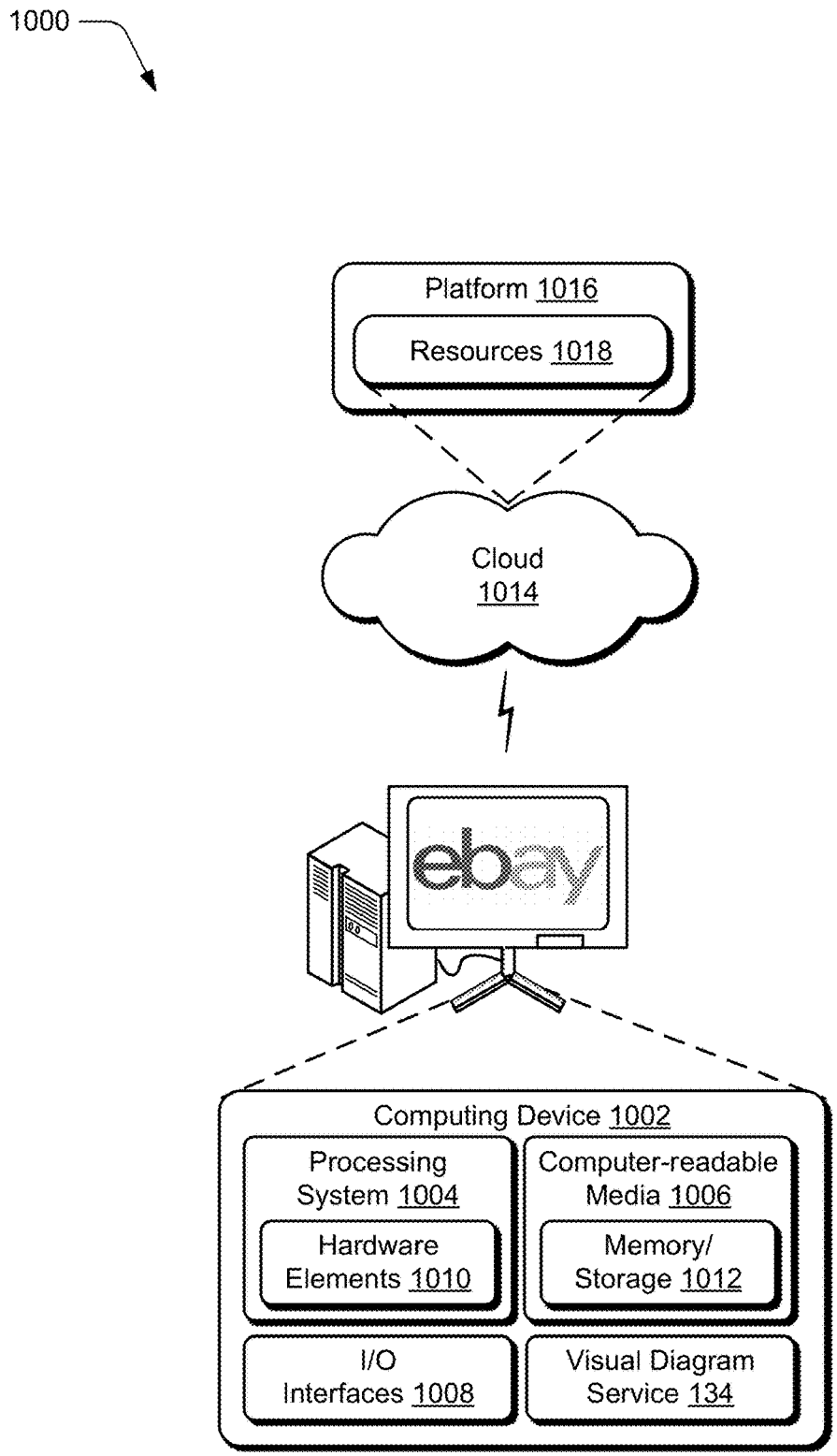
FIG. 10 illustrates an example system that includes an example computing device that is representative of one or more computing systems and/or devices that may implement the various techniques described herein.

FIG. 10 illustrates an example system generally at 1000 that includes an example computing device 1002 that is representative of one or more computing systems and/or devices that may implement the various techniques described herein. This is illustrated through inclusion of the visual diagram service 134. The computing device 1002 may be, for example, a server of a service provider, a device associated with a client (e.g., a client device), an on-chip system, and/or any other suitable computing device or computing system.

The example computing device 1002 as illustrated includes a processing system 1004, one or more computer-readable media 1006, and one or more I/O interfaces 1008 that are communicatively coupled, one to another. Although not shown, the computing device 1002 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1004 is representative of functionality to perform one or more operations using hardware. Accordingly, the processing system 1004 is illustrated as including hardware elements 1010 that may be configured as processors, functional blocks, and so forth. This may include implementation in hardware as an application specific integrated circuit or other logic device formed using one or more semiconductors. The hardware elements 1010 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 1006 is illustrated as including memory/storage 1012. The memory/storage 1012 represents memory/storage capacity associated with one or more computer-readable media. The memory/storage component 1012 may include volatile media (such as random access memory (RAM)) and/or nonvolatile media (such as read only memory (ROM), Flash memory, optical disks, magnetic disks, and so forth). The memory/storage component 1012 may include fixed media (e.g., RAM, ROM, a fixed hard drive, and so on) as well as removable media (e.g., Flash memory, a removable hard drive, an optical disc, and so forth). The computer-readable media 1006 may be configured in a variety of other ways as further described below.

Input/output interface(s) 1008 are representative of functionality to allow a user to enter commands and information to computing device 1002, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1002 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1002. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1002, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1010 and computer-readable media 1006 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1010. The computing device 1002 may be configured to implement particular instructions and/or functions corresponding to the software and/or hardware modules. Accordingly, implementation of a module that is executable by the computing device 1002 as software may be achieved at least partially in hardware, e.g., through use of computer-readable storage media and/or hardware elements 1010 of the processing system 1004. The instructions and/or functions may be executable/operable by one or more articles of manufacture (for example, one or more computing devices 1002 and/or processing systems 1004) to implement techniques, modules, and examples described herein.

The techniques described herein may be supported by various configurations of the computing device 1002 and are not limited to the specific examples of the techniques described herein. This functionality may also be implemented all or in part through use of a distributed system, such as over a "cloud" 1014 via a platform 1016 as described below.

The cloud 1014 includes and/or is representative of a platform 1016 for resources 1018. The platform 1016 abstracts underlying functionality of hardware (e.g., servers) and software resources of the cloud 1014. The resources 1018 may include applications and/or data that can be utilized while computer processing is executed on servers that are remote from the computing device 1002. Resources 1018 can also include services provided over the Internet and/or through a subscriber network, such as a cellular or Wi-Fi network.

The platform 1016 may abstract resources and functions to connect the computing device 1002 with other computing devices. The platform 1016 may also serve to abstract scaling of resources to provide a corresponding level of scale to encountered demand for the resources 1018 that are implemented via the platform 1016. Accordingly, in an interconnected device embodiment, implementation of functionality described herein may be distributed throughout the system 1000. For example, the functionality may be implemented in part on the computing device 1002 as well as via the platform 1016 that abstracts the functionality of the cloud 1014.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method implemented by at least one computing device, the method comprising:
   receiving, via a user interface displayed by the at least one computing device, search query input to locate item parts of an item that are associated with a specific region of the item, the search query input received responsive to a user selection of the specific region via a three-dimensional representation of the item that is displayed in the user interface, the three-dimensional representation of the item having multiple regions which are each mapped to a respective visual diagram of multiple visual diagrams for the item, each of the multiple visual diagrams including selectable portions mapped to respective item parts corresponding to the respective region;
   responsive to the search query input, selecting a visual diagram of the multiple visual diagrams that is mapped to the specific region of the item identified by the search query input;
   displaying the selected visual diagram of the item in the user interface, the selected visual diagram including selectable portions mapped to respective item parts depicted in the corresponding selectable portion of the selected visual diagram;
   receiving, via the user interface, a user selection of one of the selectable portions of the selected visual diagram of the item; and
   displaying, by the at least one computing device, search result data corresponding to the respective item part depicted in the selected selectable portion of the selected visual diagram of the item.

2. The method as described in claim 1, further comprising selecting the visual diagram from multiple visual diagrams associated with the item based on the item and a category of the item associated with the selected region.

3. The method as described in claim 1, wherein at least one search result data item of the displayed search result data was previously verified to be compatible with the item associated with the selected visual diagram.

4. The method as described in claim 1, wherein the selected selectable portion of the selected visual diagram is mapped directly to at least one search result data item of the item part depicted in the selected selectable portion of the selected visual diagram such that the user selection causes the at least one search result data item to be selected and displayed with the search result data.

5. The method as described in claim 1, wherein the selected selectable portion of the selected visual diagram is mapped to external metadata associated with the item part depicted in the selected selectable portion of the selected visual diagram such that the user selection causes the search result data to be selected and displayed responsive to a search performed using the external metadata associated with the item part.

6. The method as described in claim 1, wherein the search result data include at least one search result data item of a first item part manufactured by an original equipment manufacturer (OEM) and at least one search result data item of a second item part manufactured by a third party parts provider.

7. The method as described in claim 1, wherein the search result data is selectable to purchase the corresponding item part.

8. The method as described in claim 1, further comprising:
receiving hover input proximate one of the selectable portions of the selected visual diagram; and
displaying, proximate the selectable portion of the visual diagram, visual information associated with the item part depicted in the selectable region of the selected visual diagram.

9. The method as described in claim 1, wherein the three-dimensional representation of the item is rotatable.

10. The method as described in claim 1, wherein the search query input includes a photo or video of the item.

11. A computer-readable storage device comprising instructions stored thereon that, responsive to execution by one or more processors, performs operations comprising:
receiving, via a user interface, search query input to locate item parts of an item that are associated with a specific region of the item, the search query input received responsive to a user selection of the specific region via a three-dimensional representation of the item that is displayed in the user interface, the three-dimensional representation of the item having multiple regions which are each mapped to a respective visual diagram of multiple visual diagrams for the item, each of the multiple visual diagrams including selectable portions mapped to respective item parts corresponding to the respective region;
responsive to the search query input, selecting a visual diagram of the multiple visual diagrams that is mapped to the specific region of the item identified by the search query input; displaying the selected visual diagram of the item in the user interface, the selected visual diagram including selectable portions mapped to respective item parts depicted in the corresponding selectable portion of the selected visual diagram;
receiving, via the user interface, a user selection of one of the selectable portions of the selected visual diagram of the item; and
displaying search result data corresponding to the respective item part depicted in the selected selectable portion of the selected visual diagram of the item.

12. The computer-readable storage device of claim 11, wherein the three-dimensional representation of the item is rotatable.

13. The computer-readable storage device of claim 11, wherein the search query input includes a photo of the item.

14. The computer-readable storage device of claim 11, wherein the search query input includes a video of the item.

15. A system comprising:
at least a memory and a processor to perform operations comprising:
receiving, via a user interface, search query input to locate item parts of an item that are associated with a specific region of the item, the search query input received responsive to a user selection of the specific region via a three-dimensional representation of the item that is displayed in the user interface, the three-dimensional representation of the item having multiple regions which are each mapped to a respective visual diagram of multiple visual diagrams for the item, each of the multiple visual diagrams including selectable portions mapped to respective item parts corresponding to the respective region;
responsive to the search query input, selecting a visual diagram of the multiple visual diagrams that is mapped to the specific region of the item identified by the search query input;
displaying the selected visual diagram of the item in the user interface, the selected visual diagram including selectable portions mapped to respective item parts depicted in the corresponding selectable portion of the selected visual diagram;
receiving, via the user interface, a user selection of one of the selectable portions of the selected visual diagram of the item; and
displaying search result data corresponding to the respective item part depicted in the selected selectable portion of the selected visual diagram of the item.

16. The system as described in claim 15, wherein the three-dimensional representation of the item is rotatable.

17. The system as described in claim 15, wherein the search query input includes a photo of the item.

18. The system as described in claim 15, wherein the search query input includes a video of the item.

19. The system as described in claim 15, wherein the operations further comprise selecting the visual diagram from multiple visual diagrams associated with the item based on the item and a category of the item associated with the selected region.

20. The system as described in claim 15, wherein at least one search result data item of the displayed search result data was previously verified to be compatible with the item associated with the selected visual diagram.

* * * * *